Patented Aug. 7, 1934

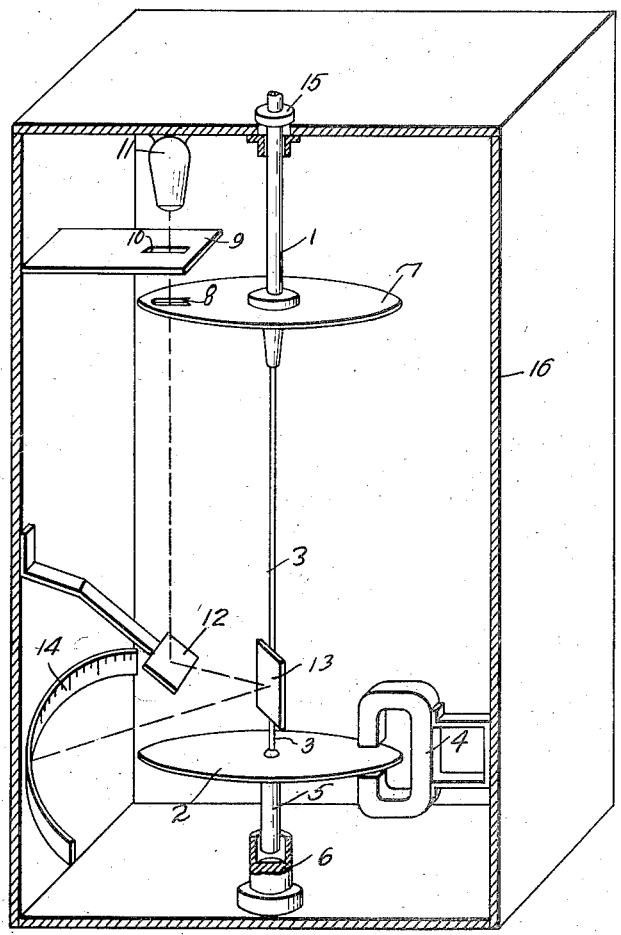

1,968,859

UNITED STATES PATENT OFFICE 1,968,859

TORSION TACHOMETER

Lybrand P. Smith, United States Navy

Original application April 23, 1932, Serial No. 607,087. Divided and this application August 16, 1932, Serial No. 629,042

7 Claims. (Cl. 264—13)

(Granted under the act of March 3, 1883, as amended April 30, 1928; 370 O. G. 757)

This invention relates to a tachometer whereby rotational speeds are measured as a function of the drag of currents induced in a metal disk, manifested in the torsion of a wire.

It is among the objects of this invention to provide a tachometer that is simple in construction and accurate in operation, and does not depend upon gravitational or centrifugal force, stroboscopic effects, or clock mechanism. With the above and other objects in view, the invention consists in the construction, combination and arrangement of parts as will be described more fully hereinafter.

This application is a division of my pending application Serial No. 607,087, filed April 23, 1932.

The drawing shows a perspective elevation of my invention.

Shaft 1 is suspended in suitable bearings 15 and is connected to be driven either directly or indirectly by the rotating member whereof the speed is to be measured. A metal disk 2 is carried from shaft 1 by a wire 3 and is mounted with its edge between the poles of a magnet 4. Whipping of wire 3 is prevented by a relatively large member 5 connected to the wire below disk 2 and disposed to rotate freely in a guide bearing 6. A disk 7 having in it a slit 8 is mounted on the lower end of shaft 1 and adjacent thereto is a screen 9 in which is a slit 10 with which slit 8 may be brought into registry. Above slit 10 is a source of light 11 from which a beam of light is projected to fixed mirror 12, thence to mirror 13 on wire 3 and thence to a scale 14, when slits 8 and 10 are in registry. The above described members are suitably mounted in a housing 16.

The operation of my invention is as follows:
When shaft 1 is rotated, disk 7 rotates therewith as does disk 2 also, but due to the generation of eddy currents in the latter as it passes through the field of magnet 4, a braking torque is exerted on disk 2 which twists wire 3 until the torsional force in the wire equals the retardational force of the generated currents, when disk 2 will rotate at the same speed as shaft 1.

When all parts of the device are at rest they are adjusted to bring source 11, slits 8 and 10, and mirror 12 into alignment in such position that the light from 11 is reflected to mirror 13 from mirror 12 in a plane that is normal to mirror 13 and scale 14 is set to intercept the reflected beam from mirror 13 at the zero point of the scale. After being so adjusted, torsion of the wire 3 will displace the beam of light from mirror 13 away from the zero of the scale and the magnitude of such displacement is a measure of the twist in the wire. Since the torsional strain in wire 3 depends upon the speed of rotation of disk 2 between the poles of magnet 4, the scale 14 can be calibrated to read rotational speeds directly, and the point on scale 14 that intercepts the beam from mirror 13 will show the rotational speed of shaft 1 in revolutions per chosen time interval.

It will be understood that the above description and accompanying drawing comprehend only the general and preferred embodiment of my invention, and that various changes in construction, proportion and arrangement of parts may be made within the scope of the appended claims without sacrificing any of the advantages of this invention.

The invention described herein may be manufactured and used by or for the Government of the United States for governmental purposes without the payment of any royalty thereon.

I claim:
1. In a device of the class described, a vertically disposed rotatable shaft, an apertured disk mounted on the lower end thereof, an apertured screen disposed to coact with said apertured disk, a torsion wire connected to said shaft and depending therefrom, a metal disk fixed to the lower end of said wire, a magnet between the poles of which said metal disk is rotatable, means to steady the rotation of said metal disk, a source of light disposed to project a beam of light through the aperture in said screen, a fixed mirror disposed to receive light from said source when the apertures in said screen and said apertured disk are in registry, a mirror on said torsion wire to receive light from said fixed mirror, and a scale positioned to receive light from said mirror on the torsion wire.

2. In a device of the class described, a vertically disposed rotatable shaft, an apertured disk mounted on the lower end thereof, an apertured screen disposed to coact with said apertured disk, a torsion member connected to and depending from said shaft, a metal disk fixed to the lower end of said member, a magnet between the poles of which said metal disk is rotatable, a source of light disposed to project a beam of light through the aperture in said screen, a fixed mirror disposed to receive light from said source when the apertures in said screen and said apertured disk are in registry, a mirror on said torsion wire to receive light from said fixed mirror, and a scale positioned to receive light from said mirror on the torsion wire.

3. In a device of the class described, a vertically disposed rotatable shaft, an apertured disk mounted on the lower end thereof, an apertured screen disposed to coact with said apertured disk, a torsion member connected to and depending from said shaft, a metal disk fixed to the lower end of said member, means to set up a magnetic field to be cut by said metal disk, a source of light disposed to project a beam of light through the aperture in said screen, a fixed mirror disposed to receive light from said source when the apertures in said screen and said apertured disk are in registry, a mirror on said torsion wire to receive light from said fixed mirror, and a scale positioned to receive light from the mirror on said torsion wire.

4. In a device of the class described, a rotatable member, a source of light, a screen adjacent said light having an aperture through which light from said source passes, an element rotatable in synchronism with said member having in it an aperture adapted to be brought into registry with the aperture in said screen once in each rotation, a torsion member connected to said rotatable member to rotate therewith, an electro-inductive means connected to said torsion member whereby said torsion member is twisted proportionately to its speed of rotation, a mirror carried thereby, a scale disposed to receive light from said mirror, and means to project to said mirror light that passes through the apertures in said screen and said element.

5. In a device of the class described, a rotatable member, a torsion member carried thereby to rotate therewith, an electro-inductive device connected to said torsion member whereby said torsion member is twisted proportionately to its speed of rotation, a mirror carried by said torsion member, means to project to said mirror a beam of light at the same angular position in each rotation of said rotatable member, and a scale disposed to receive light reflected from said mirror.

6. In a device of the class described, a rotatable member, a torsion member carried thereby to rotate therewith, means connected to said torsion member whereby said torsion member is twisted proportionately to its speed of rotation, a mirror carried by said torsion member, means to project to said mirror a beam of light at the same angular position in each rotation of said rotatable member, and a scale disposed to receive light reflected from said mirror.

7. In a device of the class described, a rotatable member, a torsion member carried thereby to rotate therewith, means connected to said torsion member whereby said torsion member is twisted proportionately to its speed of rotation, a mirror carried by said torsion member, means to project to said mirror a beam of light at the same angular position in each rotation of said rotatable member, and means to indicate the relative angular position of the beam reflected from said mirror.

LYBRAND P. SMITH.